United States Patent
Akkiraju et al.

(10) Patent No.: US 10,311,895 B2
(45) Date of Patent: *Jun. 4, 2019

(54) ASSESSING THE STRUCTURAL QUALITY OF CONVERSATIONS

(71) Applicant: International Business Machines Corporation, Armonk, NY (US)

(72) Inventors: Rama Kalyani T. Akkiraju, Cupertino, CA (US); Jalal Mahmud, San Jose, CA (US); Vibha S. Sinha, Santa Clara, CA (US); Anbang Xu, San Jose, CA (US); Pritam S. Gundecha, San Jose, CA (US); MD Mansurul A. Bhuiyan, San Jose, CA (US); Shereen M. Oraby, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/997,967

(22) Filed: Jun. 5, 2018

(65) Prior Publication Data

US 2019/0096426 A1   Mar. 28, 2019

Related U.S. Application Data

(63) Continuation of application No. 15/888,654, filed on Feb. 5, 2018, now Pat. No. 10,037,768, which is a
(Continued)

(51) Int. Cl.
*G10L 25/63* (2013.01)
*G06F 17/30* (2006.01)
(Continued)

(52) U.S. Cl.
CPC ........ *G10L 25/63* (2013.01); *G06F 16/24578* (2019.01); *G06F 16/634* (2019.01);
(Continued)

(58) Field of Classification Search
CPC ....................................................... G10L 25/63
(Continued)

(56) References Cited

U.S. PATENT DOCUMENTS 7,305,345 B2   12/2007   Bares et al.
7,602,892 B2   10/2009   Cragun
(Continued)

FOREIGN PATENT DOCUMENTS

WO   2010078614 A1   7/2010
WO   2015018200 A1   12/2015
WO   2016007296 A1   1/2016

OTHER PUBLICATIONS

Stolcke et al., "Dialogue Act Modeling for Automatic Tagging and Recognition of Conversational Speech", Association for Computational Linguistics; © 2000, 34 pages.
(Continued)

*Primary Examiner* — Susan I McFadden
(74) *Attorney, Agent, or Firm* — Edward J. Wixted, III

(57) ABSTRACT

Input of a conversation is received. The conversation includes at least a first user. An utterance of the conversation is analyzed to identify a dialog act attribute, an emotion attribute, and a tone attribute. The dialog act attribute, emotion attribute, and tone attribute are annotated to the utterance of the conversation. The conversation is validated based on the annotated attributes compared with a threshold. The annotated conversation and the validation of the conversation are stored.

1 Claim, 4 Drawing Sheets

Related U.S. Application Data continuation of application No. 15/715,552, filed on Sep. 26, 2017.

(51) Int. Cl.
  *H04M 3/22* (2006.01)
  *G06Q 10/06* (2012.01)
  *G06F 16/632* (2019.01)
  *G06F 16/2457* (2019.01)

(52) U.S. Cl.
  CPC .... *G06F 17/3053* (2013.01); *G06F 17/30758* (2013.01); *G06Q 10/06316* (2013.01); *H04M 3/2236* (2013.01)

(58) Field of Classification Search
  USPC .......................................................... 704/221
  See application file for complete search history.

(56) References Cited

U.S. PATENT DOCUMENTS

| | | | |
|---|---|---|---|
| 8,094,790 | B2 | 1/2012 | Conway et al. |
| 10,037,768 | B1 * | 7/2018 | Akkiraju ................. G10L 15/22 |
| 2005/0278180 | A1 | 12/2005 | O'Neill et al. |
| 2006/0155642 | A1 | 7/2006 | Pettersen |
| 2011/0295597 | A1 | 12/2011 | Brady |
| 2012/0137367 | A1 | 5/2012 | Dupont et al. |
| 2014/0220526 | A1 | 8/2014 | Sylves |
| 2014/0379729 | A1 | 12/2014 | Savage et al. |
| 2016/0217807 | A1 | 7/2016 | Gainsboro et al. |
| 2016/0360336 | A1 | 12/2016 | Gross et al. |

OTHER PUBLICATIONS

Kluwer et al., "Using Syntactic and Semantic based Relations for Dialogue Act Recognition"; Coling 2010: Poster Volume, Beijing, Aug. 2010; pp. 570-578.

Tur et al., "Model Adaptation for Dialog Act Tagging", © 2006 IEEE; 4 pages.

Schiffrin, "Modelling Speech Acts in Conversational Discourse", The University of Leeds School of Computing, May 2005; 312 pages.

Bunt et al., "Towards an ISO standard for dialogue act annotation"; Seventh conference on International Language Resources and Evaluation (LREC'10), May 2010, La Valette, Malta. 2010, 9 pages.

Vosoughi et al., "Tweet Acts: A Speech Act Classifier for Twitter", Association for the Advancement of Artificial Intelligence, © 2016, <www.aaai.org>; 4 pages.

Zhang et al., "What Are Tweeters Doing: Recognizing Speech Acts in Twitter", Analyzing Microtext: Papers from the 2011 AAAI Workshop (WS-11-05); 6 pages.

Kim et al., "Classifying Dialogue Acts in One-on-one Live Chats", 2010 Conference on Empirical Methods in Natural Language Processing, MIT, Massachusetts, Oct. 2010, © 2010 Association for Computational Linguistics; 10 pages.

Ivanovic, "Automatic instant messaging dialogue using statistical models and dialogue acts", Masters Research thesis, Faculty of Engineering, Computer Science and Software Engineering, University of Melbourne, Jul. 2008, <http://hdl.handle.net/11343/39499>; 196 pages.

Zhang et al., "Towards Scalable Speech Act Recognition in Twitter: Tackling Insufficient Training Data", Proceedings of the Workshop on Semantic Analysis in Social Media; Avignon—France, Apr. 23, 2012, 10 pages.

Ang et al., "Automatic Dialogue Act Segmentation and Classification in Multiparty Meetings", Jan. 2005; 4 pages.

"Dialog Act Recognition 2014", Meta-Guide.com, May 31, 2017; <http://meta-guide.com/dialog-act-recognition-2014>; 13 pages.

Jarvela et al., "Web-based Cases in Teaching and Learning—the Quality of Discussions and a Stage of Perspective Taking in Asynchronous Communication", Interactive Learning Environments 2002, vol. 10, No. 1; pp. 1-22.

Jeong et al., "Semi-supervised Speech Act Recognition in Emails and Forums", 2009 Conference on Empirical Methods in Natural Language Processing, Singapore, Aug. 6-7, 2009, © 2009 ACL and AFNLP; pp. 1250-1259.

Akkiraju et al., "Assessing the Structural Quality of Conversations", U.S. Appl. No. 15/715,552, filed Sep. 26, 2017, 33 pages.

Akkiraju et al., "Assessing the Structural Quality of Conversations", U.S. Appl. No. 15/888,6542, filed Feb. 5, 2018, 33 pages.

Akkiraju et al., "Assessing the Structural Quality of Conversations", U.S. Appl. No. 16/000,038, filed Jun. 5, 2018, 29 pages.

IBM, List of Patent Applications Treated as Related, Appendix P, Filed Herewith, 2 pages.

* cited by examiner

ASSESSING THE STRUCTURAL QUALITY OF CONVERSATIONS

BACKGROUND

The present invention relates generally to the field of conversation, and more particularly to assessing the structural quality of conversations.

Customer satisfaction is an important metric to companies as happy customers drive profits. A popular mechanism for assisting customers and keeping customers happy is the customer service center, also known as a customer contact center. A customer service center assists the customer by providing a company contact (human) or an automated system (or bot, i.e., an application that performs an automated task) for ordering products, providing information, resolving concerns, and the like. Conversations between customers and the company representative (human or bot) are monitored for quality control as a means of improving communication and maintaining high customer satisfaction.

SUMMARY OF THE INVENTION

Embodiments of the present invention include an approach for assessing the structural quality of conversations. In one embodiment, input of a conversation is received. The conversation includes at least a first user. An utterance of the conversation is analyzed to identify a dialog act attribute, an emotion attribute, and a tone attribute. The dialog act attribute, emotion attribute, and tone attribute are annotated to the utterance of the conversation. The conversation is validated based on the annotated attributes compared with a threshold. The annotated conversation and the validation of the conversation are stored.

DETAILED DESCRIPTION

Embodiments of the present invention provide for assessing the structural quality of conversations. A customer calling a service center to complain about an issue regarding a purchased product starts out somewhat irritated at the beginning of the call. Depending on the disposition and effectiveness of the company representative, the call can result in a happy customer or a dissatisfied customer. How well the company representative did in satisfying the customer is sometimes measured after the fact via a survey done at the completion of the call. If the customer was dissatisfied, the after the fact survey does not help resolve the issue in real time.

Current methods of conversation analysis are derived from the sociolinguistic field. Structural models are presented to analyze conversations. However, the current models do not provide computation models for automatically computing the quality metric of a conversation. Current methods do not generate a multi-dimensional quality metric for assessing the structural quality of conversations using computation models and for ranking the conversations based on user adjusted preference parameters for the purpose of gaining insights to improve contact center management.

Embodiments of the present invention recognize that there is an approach for assessing the structural quality of conversations. In an embodiment, various types of annotations such as the tone, emotion, and dialog act for each utterance in a conversation is determined and annotated to a record of the conversation in real time (i.e., as the conversation is on-going). The annotated conversation is analyzed against best practice patterns and suggested dialog acts are provided to the company representative to better satisfy the customer.

The present invention will now be described in detail with reference to the Figures.

Figure 1:
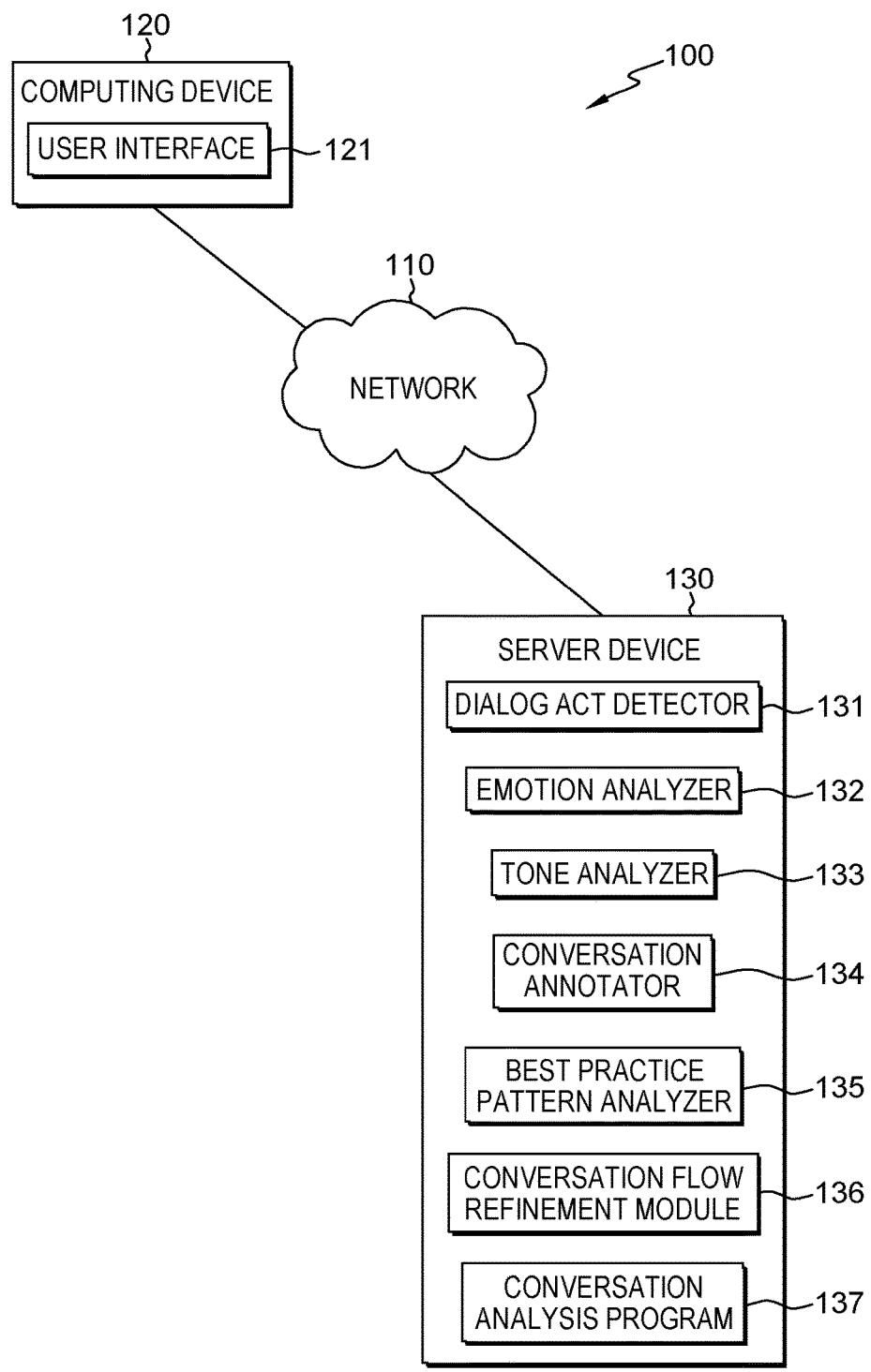
FIG. 1 depicts a functional block diagram of a computing environment, in accordance with an embodiment of the present invention.

FIG. 1 is a functional block diagram illustrating a computing environment, generally designated 100, in accordance with one embodiment of the present invention. FIG. 1 provides only an illustration of one implementation and does not imply any limitations with regard to the systems and environments in which different embodiments may be implemented. Many modifications to the depicted embodiment may be made by those skilled in the art without departing from the scope of the invention as recited by the claims.

In an embodiment, computing environment 100 includes computing device 120 and server device 130, connected to network 110. In example embodiments, computing environment 100 may include other computing devices (not shown in FIG. 1) such as smartwatches, cell phones, smartphones, wearable technology, phablets, tablet computers, laptop computers, desktop computers, other computer servers or any other computer system known in the art, interconnected to computing device 120 and server device 130, over network 110.

In an embodiment of the present invention, computing device 120 and server device 130 connect to network 110, which enables computing device 120 and server device 130 to access other computing devices and/or data not directly stored on computing device 120 and server device 130. Network 110 may be, for example, a short-range, low power wireless connection, a local area network (LAN), a telecommunications network, a wide area network (WAN) such as the Internet, or any combination of the three, and include wired, wireless, or fiber optic connections. Network 110 may include one or more wired and/or wireless networks that are capable of receiving and transmitting data, voice, and/or video signals, including multimedia signals that include voice, data, and video information. In general, network 110 can be any combination of connections and protocols that will support communications between computing device 120 and server device 130, and any other computing devices connected to network 110, in accordance with embodiments of the present invention. In an embodiment, data received by another computing device (not shown in FIG. 1) in computing environment 100 may be communicated to computing device 120 and server device 130 via network 110.

According to embodiments of the present invention, computing device 120 and server device 130 may be a laptop, tablet, or netbook personal computer (PC), a desktop computer, a personal digital assistant (PDA), a smartphone, a phablet, a smart watch, a fitness tracker or any other wearable technology, a smart television, a smart digital video recorder, a security camera, a smart automobile, or any other programmable electronic device capable of communicating with any other computing device within computing environment 100. In an embodiment, computing environment 100 includes any number of computing device 120 and server device 130.

In certain embodiments, computing device 120 and/or server device 130 represent a computer system utilizing clustered computers and components (e.g., database server computers, application server computers, etc.) that act as a single pool of seamless resources when accessed by elements of computing environment 100. In general, computing device 120 and server device 130 are representative of any electronic device or combination of electronic devices capable of executing computer readable program instructions. Computing device 120 and server device 130 may include components as depicted and described in further detail with respect to FIG. 4, in accordance with embodiments of the present invention.

According to an embodiment of the present invention, computing device 120 includes user interface 121. In an embodiment, user interface 121 provides an interface between a user of computing device 120, network 110 and any other devices connected to network 110. User interface 121 allows a user of computing device 120 to interact with the Internet and also enables the user to receive an indicator of one or more previous viewing locations and a summary of viewing history on the Internet. In general, a user interface is the space where interactions between humans and machines occur. User interface 121 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 121 may also be mobile application software that provides an interface between a user of computing device 120 and network 110. Mobile application software, or an "app," is a computer program designed to run on smartphones, phablets, tablet computers and other mobile devices.

According to embodiments of the present invention, server device 130 includes dialog act detector 131, emotion analyzer 132, tone analyzer 133, conversation annotator 134, best practice pattern analyzer 135, conversation flow refinement module 136, and conversation analysis program 137. In one embodiment, dialog act detector 131, emotion analyzer 132, tone analyzer 133, conversation annotator 134, best practice pattern analyzer 135, and conversation flow refinement module 136 are separate from conversation analysis program 137. In another embodiment, dialog act detector 131, emotion analyzer 132, tone analyzer 133, conversation annotator 134, best practice pattern analyzer 135, and conversation flow refinement module 136 are part of conversation analysis program 137. In yet another embodiment, some of dialog act detector 131, emotion analyzer 132, tone analyzer 133, conversation annotator 134, best practice pattern analyzer 135, and conversation flow refinement module 136 are separate from conversation analysis program 137 while others are part of conversation analysis program 137.

In an embodiment, dialog act detector 131 is a program, a subprogram of a larger program, an application, a plurality of applications, or mobile application software, which functions to detect the dialog act for each utterance in a conversation. A program is a sequence of instructions written by a programmer to perform a specific task. According to an embodiment of the present invention, dialog act detector 131 is programmed by using supervised learning techniques based on known dialog act labels of example utterances. Feature engineering techniques are applied to extract linguistic and semantic features from the utterances. Machine learning models are trained to predict the dialog act labels of utterances using the extracted linguistic and semantic features. Machine learning is the subfield of computer science that gives "computers the ability to learn without being explicitly programmed". Evolved from the study of pattern recognition and computational learning theory in artificial intelligence, machine learning explores the study and construction of algorithms that can learn from and make predictions on data—such algorithms overcome following strictly static program instructions by making data-driven predictions or decisions, through building a model from sample inputs. Machine learning is employed in a range of computing tasks where designing and programming explicit algorithms with good performance is difficult or unfeasible; example applications include email filtering, detection of network intruders or malicious insiders working towards a data breach, optical character recognition (OCR), learning to rank and computer vision. Dialog acts include, but are not limited to: counter-greeting, opening statement, question, problem description, reply, acknowledgement, problem resolution, statement, acceptance, rejection, action-directive, apology, excuse, request, ultimatum, seeking permission, complaint, confirm presence, exclamation, ridicule, and command.

According to an embodiment of the present invention, emotion analyzer 132 is a program, a subprogram of a larger program, an application, a plurality of applications, or mobile application software, which functions to analyze each utterance in a conversation and determine the emotion of each utterance in the conversation. A program is a sequence of instructions written by a programmer to perform a specific task. According to an embodiment of the present invention, emotion analyzer 132 is programmed by using supervised learning techniques based on known emotion labels of example utterances. Feature engineering techniques are applied to extract linguistic and semantic features from the utterances. Machine learning models are trained to predict the emotion labels of utterances using the extracted linguistic and semantic features. Emotions include, but are not limited to: anger, disgust, sadness, fear, joy, happiness, elation, curious, surprise, trust, anticipation, shame, pity, envy, indignation, love, and kindness.

According to an embodiment of the present invention, tone analyzer 133 is a program, a subprogram of a larger program, an application, a plurality of applications, or mobile application software, which functions to analyze each utterance in a conversation and determine the tone of each utterance in the conversation. A program is a sequence of instructions written by a programmer to perform a specific task. According to an embodiment of the present invention, tone analyzer 133 is programmed by using supervised learning techniques based on known tone labels of example utterances. Feature engineering techniques are applied to extract linguistic and semantic features from the utterances. Machine learning models are trained to predict the tone labels of utterances using the extracted linguistic and semantic features. Tones include, but are not limited to: bold, happy, supportive, clever, mysterious, disgruntled, irritated, outraged, startled, quizzical, bitter, absurd, annoyed, witty, submissive, light-hearted, jaded, formal, humorous, direct, defiant, disappointed, belligerent, concerned, nasty, and pragmatic.

According to an embodiment of the present invention, conversation annotator 134 is a program, a subprogram of a larger program, an application, a plurality of applications, or mobile application software, which functions to annotate the dialog act, emotion, and tone for each utterance in a conversation to each specific utterance in the conversation. A program is a sequence of instructions written by a programmer to perform a specific task. According to an embodiment of the present invention, conversation annotator 134 uses the results from dialog act detector 131, emotion analyzer 132, and tone analyzer 133 to annotate each metric (i.e., dialog act or DA, emotion or E, and tone or T) to the appropriate utterance in the conversation. For example, the phrase "Hello, I have a quick question about my bill." is annotated as follows: "Hello, I have a quick question about my bill. [DA—greeting, question/E—none/T—pleasant]."

According to an embodiment of the present invention, best practice pattern analyzer 135 is a program, a subprogram of a larger program, an application, a plurality of applications, or mobile application software, which functions to analyze an utterance of a conversation, along with the associated dialog act, emotion, and tone of the utterance, in order to determine the best response option to the utterance by determining a score for each utterance. A program is a sequence of instructions written by a programmer to perform a specific task. In an embodiment, best practice pattern analyzer 135 determines the "best practice" by comparing each utterance in the conversation that has been annotated with the appropriate metrics to a known database of "best practice" annotated conversations. In the embodiment, the database of best practices was created by a best practice model. The best practice model is a machine learning model which learns from annotated conversation samples containing representative "best practices" as determined by a user (e.g., trainer). In an embodiment, each utterance is scored based on the number of violations determined by best practice pattern analyzer 135.

In a first embodiment for analyzing a complete conversation, best practice pattern analyzer 135 adopts computational approaches such as sequence alignment algorithms. Both a complete conversation and the "best practices" are considered as a sequence of annotations including dialog act, emotion, and tone. The system adopts edit distances such as the Levenshtein distance to compute the similarity between a conversation and the "best practices", and then ranks the conversation based on the similarity scores. In addition, for a lengthy conversation, the system divides the long sequence of annotations into subsequences according to certain criteria (e.g., the pre-defined window size) and compares the local similarity score between a subsequence and the "best practices". Local scores of the subsequences are aggregated to construct the goal score of a conversation for ranking purposes. Best practice pattern analyzer 135 generates a report summarizing the violations of conversations against the "best practices".

In a second embodiment for analyzing an on-going conversation in real-time, best practice pattern analyzer 135 predicts the next best action (i.e., the most appropriate tone or the proper dialog act) to adopt in a response. Information retrieval methods are applied to take the annotations of an on-going conversation as a query to retrieve the next action whose associated "best practices" is most similar to the on-going conversation. The similarity measure is based on sequence alignment algorithms. In another embodiment, a sequence-to-one model is trained by deep learning techniques based on "best practices". The model is applied to take the sequence of annotations of an on-going conversation as the input sequence and predict a set of annotations for the next response.

According to embodiments of the present invention, best practice pattern analyzer 135 allows users to configure the priority of conversation ranking. In an embodiment, a weighted edit distance between a conversation and "best practices" is defined to assign additional weights to certain types or sets of annotations. For example, a user may weight "emotion" responses above "dialog act" and "tone". In another embodiment, simple multi-dimensional sorting is used by specifying the order for priority between "dialog act", "emotion", and "tone" annotation categories.

According to embodiments of the present invention, conversation flow refinement module 136 uses inputs such as annotated conversations, ranked conversations, and conversation violations, determined by best practice pattern analyzer 135, to determine training for company representatives and to generated improved conversation scripts/dialog flow for bots that are acting as company representatives. In an embodiment, conversation flow refinement module 136 uses natural language processing (NLP) techniques art such as dictionary-based and topic-modeling approaches to extract linguistic and semantic patterns from the conversation violations. In another embodiment, conversation flow refinement module 136 uses highly ranked conversations to generate improved conversation scripts by applying text augmentation techniques to convert the highly ranked conversations into templates and the templates are used to generated improved conversation scripts. Conversation flow refinement module 136 also uses the highly ranked conversations to train a deep-learning based sequence-to-sequence model and the beam-search methods to generate improved conversation scripts. In addition to the NLP techniques, text augmentation and sequence-to-sequence modeling, other techniques also well known in the art may be used to improve conversations.

According to embodiments of the present invention, conversation analysis program 137 is a program, a subprogram of a larger program, an application, a plurality of applications, or mobile application software, which functions to assess the structural quality of conversations. A program is a sequence of instructions written by a programmer to perform a specific task. Conversation analysis program 137 may run by itself but may be dependent on system software (not shown in FIG. 1) to execute. In one embodiment, conversation analysis program 137 functions as a stand-alone program residing on server device 130. In another embodiment, conversation analysis program 137 may work in conjunction with other programs, applications, etc., found in computing environment 100. In yet another embodiment, conversation analysis program 137 may be found on computing device 120 or on other computing devices (not shown in FIG. 1) in computing environment 100, which are interconnected to server device 130 via network 110.

Figure 2:
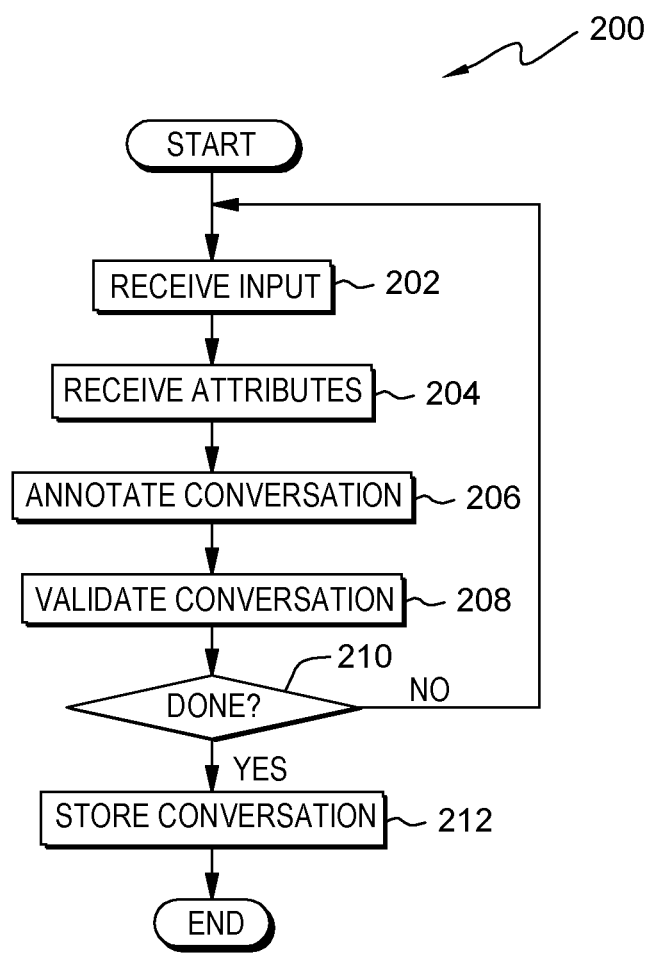
FIG. 2 depicts a flowchart of a program for assessing the structural quality of a conversation in real time, in accordance with an embodiment of the present invention.

FIG. 2 is a flowchart of workflow 200 depicting an approach for preventing activity delays using analysis from smart computing devices. In one embodiment, the method of workflow 200 is performed by conversation analysis program 137. In an alternative embodiment, the method of workflow 200 may be performed by any other program working with conversation analysis program 137. In an embodiment, a user, via user interface 121, may invoke workflow 200 upon opening an application on computing device 120. In an alternative embodiment, a user may invoke workflow 200 upon accessing conversation analysis program 137.

In an embodiment, conversation analysis program 137 receives input (step 202). In other words, conversation analysis program 137 receives input of a conversation occurring in real time. In an embodiment, the conversation is between two people (e.g., a customer and a company representative). In another embodiment, the conversation is between a person (e.g., a customer) and a bot (e.g., an automated response system representing a company). According to an embodiment of the present invention, conversation analysis program 137 receives the conversation in real time as the conversation is on-going between the two parties. In an embodiment, the conversation is separated into individual utterances or a combination of utterances that results in a complete sentence. In an embodiment, conversation analysis program 137 receives conversation input between a first user of computing device 120 and a second user of server device 130; the conversation uses network 110 to enable communication between computing device 120 and server device 130. For example, customer "Jill" is chatting to company representative "Dan" over the Internet regarding an item "Jill" purchased from the company represented by "Dan".

In the example, a portion of the conversation proceeds as follows:

"Jill"—Can you delete this account or not?
"Dan"—I will refer you to our account specialist so this account gets deleted, okay?
"Jill"—This does not make any sense!
"Dan"—I am really sorry about this inconvenience but our account specialist will handle this for your, okay?
"Jill"—Fine, please put me in touch with someone that can help me.

In an embodiment, conversation analysis program 137 receives attributes (step 204). In other words, conversation analysis program 137 receives dialog act (DA), emotion (E), and tone (T) metric attributes from dialog act detector 131, emotion analyzer 132, and tone analyzer 133, respectively, for each utterance in the conversation. In an embodiment, conversation analysis program 137 receives the metric attributes directly from dialog act detector 131, emotion analyzer 132, and tone analyzer 133. In another embodiment, conversation analysis program 137 receives the metric attributes from a database stored to a memory (not shown in FIG. 1) included on server device 130. For example, conversation analysis program 137 receives the following metric attributes for the on-going conversation between "Jill" and "Dan": question, frustration, anger, seeking permission, apologetic, fear, ridicule, confident, analytical, command, satisfied, and neutral.

In an embodiment, conversation analysis program 137 annotates conversation (step 206). In other words, conversation analysis program 137 annotates the received dialog act, emotion, and tone metric attributes to a transcript of the on-going conversation. In an embodiment, the conversation is annotated by conversation annotator 134. In another embodiment, the conversation is annotated directly by conversation analysis program 137. In an embodiment, conversation analysis program 137 creates a transcript of the on-going conversation between the two parties and then annotates the received attributes to the appropriate utterances of the conversation.

In the example, the conversation is annotated as follows:
"Jill"—Can you delete this account or not? [Dialog Act: Question] [Emotion: Anger] [Tone: Frustration]
"Dan"—I will refer you to our account specialist so this account gets deleted, okay? [Dialog Act: Seeking Permission] [Emotion: Fear] [Tone: Apologetic]
"Jill"—This does not make any sense! [Dialog Act: Ridicule] [Emotion: Anger] [Tone: Confident/Analytical]
"Dan"—I am really sorry about this inconvenience but our account specialist will handle this for your, okay? [Dialog Act: Seeking Permission] [Emotion: Fear] [Tone: Apologetic]
"Jill"—Fine, please put me in touch with someone that can help me. [Dialog Act: Command] [Emotion: Neutral] [Tone: Satisfied].

In an embodiment, conversation analysis program 137 validates conversation (step 208). In other words, conversation analysis program 137 uses best practice pattern analyzer 135 to validate the on-going conversation based on the annotated metric attributes. In an embodiment, the annotated metric attributes are compared to a threshold emotional response. The threshold is based on an assessment of whether the customer is satisfied or dissatisfied (e.g., happy or sad, content or discontented, pleased or irritated, etc.). In an embodiment between two humans (i.e., a customer and a company representative), conversation analysis program 137 validates the on-going conversation in real time by determining scores for each utterance and then suggesting appropriate responses to the company representative as needed in an effort to improve customer satisfaction. In an embodiment between a human customer and a bot, conversation analysis program 137 validates the pre-defined dialog/auto-generated response before the response is provided to the customer. In the embodiment, if conversation analysis program 137 determines that the customer is dissatisfied, conversation analysis program 137 can transfer the on-going conversation to a human company representative in an effort to improve customer satisfaction or can replace the pre-defined dialog/auto-generated response with a more appropriate response before sending any response to the customer.

In another embodiment, conversation analysis program 137 uses conversation flow refinement module 136 to validate the conversation. In the embodiment, conversation flow refinement module 136 analyzes the violation report determined by best practice pattern analyzer 135 and uses natural language processing techniques such as dictionary-based approaches and topic modeling approaches to extract linguistic and semantic patterns from the violations. Conversation analysis program 137 can then construct fine-grained guidelines from the extracted patterns to train customer service representatives to avoid the problem patterns in the future.

In an embodiment, conversation analysis program 137 determines whether the conversation is done (decision step 210). In other words, conversation analysis program 137 determines whether the on-going conversation between the two parties is completed. In an embodiment (decision step 210, NO branch), conversation analysis program 137 determines that the conversation is not done between the two parties; therefore, conversation analysis program 137 returns to step 202 to receive additional input. In the embodiment (decision step 210, YES branch), conversation analysis program 137 determines that the conversation is done between the two parties; therefore, conversation analysis program 137 proceeds to step 212.

In an embodiment, conversation analysis program 137 stores conversation (step 212). In other words, conversation analysis program 137 stores the annotated conversation and the results from best practice pattern analyzer 135 to a memory. In an embodiment, the annotated conversation and the results from best practice pattern analyzer 135 for the analysis of the on-going conversation are stored to a database found in a memory (not shown in FIG. 1) on server device 130. For example, the entire annotated and scored conversation between customer "Jill" and company representative "Dan", and any recommendations made to "Dan" for proper responses to "Jill" is stored to a memory.

Figure 3:
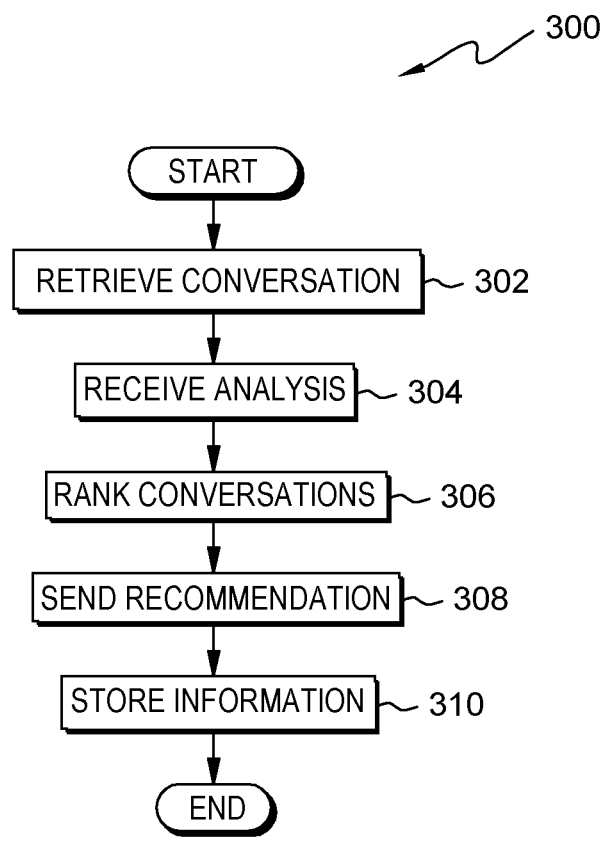
FIG. 3 depicts a flowchart of a program for assessing the structural quality of a plurality of conversations, in accordance with an embodiment of the present invention.

FIG. 3 is a flowchart of workflow 300 depicting an approach for assessing the structural quality of a plurality of conversations. In one embodiment, the method of workflow 300 is performed by conversation analysis program 137. In an alternative embodiment, the method of workflow 300 may be performed by any other program working with conversation analysis program 137. In an embodiment, a user, via user interface 121, may invoke workflow 300 upon opening an application on computing device 120. In an alternative embodiment, a user may invoke workflow 300 upon accessing conversation analysis program 137.

In an embodiment, conversation analysis program 137 retrieves conversation (step 302). In other words, conversation analysis program 137 retrieves a plurality of annotated and scored conversations from a database stored to a memory (not shown in FIG. 1) on server device 130. In an embodiment, conversation analysis program 137 retrieves the plurality of conversations from a pre-defined time frame (e.g., from the last week, from the last two weeks, from the last month, etc.). In another embodiment, conversation analysis program 137 retrieves the plurality of conversations that are selected by a user from a list of available annotated conversations. In yet another embodiment, conversation analysis program 137 retrieves the plurality of conversations that are selected by conversation analysis program 137 from a list of available annotated conversations. In yet another embodiment, conversation analysis program 137 retrieves the plurality of conversations that are selected by best practice pattern analyzer 135 from a list of available annotated conversations. For example, all of the thirty annotated conversations held over the last two weeks are retrieved from memory.

In an embodiment, conversation analysis program 137 receives analysis (step 304). In other words, conversation analysis program 137 receives a completed analysis performed by best practice pattern analyzer 135 on the retrieved annotated conversations. In an embodiment, the analysis performed by best practice pattern analyzer 135 determines violations found in each of the retrieved annotated conversations. The violations are based on the proper dialog act, emotion, and tone that should be included in a response to a given dialog act received from a user. For example, if a received dialog act is a greeting (e.g., "Hello"), the proper dialog act to respond with is a counter-greeting (e.g., "Hi"). An improper response to a greeting would be a sarcastic question (e.g., "What do you want?"). In another example, if a dialog act includes a particular emotion (e.g., "anger", "irritation", "frustration", etc.), the proper dialog act to respond with would include an emotion to defuse the situation (e.g., sincerity, apologetic, etc.). In an embodiment, best practice pattern analyzer 135 determines the number and types of violations for each of the retrieved annotated conversations and provides the results to conversation analysis program 137. For example, of the thirty annotated conversations analyzed, fourteen conversations were determined to have zero to one violations, six conversations were determined to have two to three violations, five conversations were determined to have four to five violations, three conversations were determined to have six to seven violations, and two conversations were determined to have 8 or more violations.

In an embodiment, conversation analysis program 137 ranks conversation (step 306). In other words, conversation analysis program 137 ranks the annotated conversations based on the results of the analysis completed by best practice pattern analyzer 135. According to an embodiment of the present invention, the ranking is done from best to worst based on the number of violations determined by best practice pattern analyzer 135. For example, the fourteen conversations with zero to one violations are ranked "1", the six conversations with two to three violations are ranked "2", the five conversations with four to five violations are ranked "3", the three conversations with six to seven violations are ranked "4", and the two conversations with eight or more violations are ranked "5". In other embodiments, ranking is done via sequence alignment algorithms, a sequence-to-one model, and a weighted edit distance, which were previously discussed.

In an embodiment, conversation analysis program 137 sends recommendation (step 308). In other words, conversation analysis program 137 reviews the results of the analysis by best practice pattern analyzer 135 for lower ranked annotated conversations and sends recommendations to a user for improving the conversations between two parties. In an embodiment, the recommendations include training for human company representatives to better respond to customers. In another embodiment, the recommendations include changes in pre-defined dialog or auto-generated responses for bots which are representing a company to a human customer. According to an embodiment of the present invention, the first recommendations are sent based on the worst ranked annotated conversations, the second recommendations are sent based on the next-to-worst ranked annotated conversations, and the process continues until recommendations have been sent for all of the ranked annotated conversations. For example, a first recommendation, sent to a user to improve the worst ranked annotated conversations, includes the following: "follow a greeting with a counter-greeting and not a question", "respond with compassion rather than sarcasm", and "keep a positive tone instead of a negative tone".

In another embodiment, conversation analysis program 137 uses conversation flow refinement module 136 to generate recommendations. In the embodiment, conversation flow refinement module 136 applies text augmentation techniques to the highly ranked conversations to generate conversation templates from the highly ranked conversations which are used to create improved conversation scripts. In addition, the highly ranked conversations can be used to train a deep-learning based sequence-to-sequence model. A beam search method can then be applied to the model to generate improved scripts.

In an embodiment, conversation analysis program 137 stores information (step 310). In other words, conversation analysis program 137 stores the retrieved annotated conversations as a grouping, the analysis received from best practice pattern analyzer 135, the ranking of the annotated conversations in the grouping, and the sent recommendations to a database in a memory. According to an embodiment of the present invention, the memory (not shown in FIG. 1) is included on server device 130. According to another embodiment of the present invention, the memory (not shown in FIG. 1) is included on computing device 120 or included on any other computing device (not shown in FIG. 1) accessible by server device 130 via network 110. In an embodiment, conversation analysis program 137 stores the information to a database in a memory included on server device 130. For example, the information regarding the thirty annotated and scored conversations is stored to a database in a memory on a company server.

Figure 4:
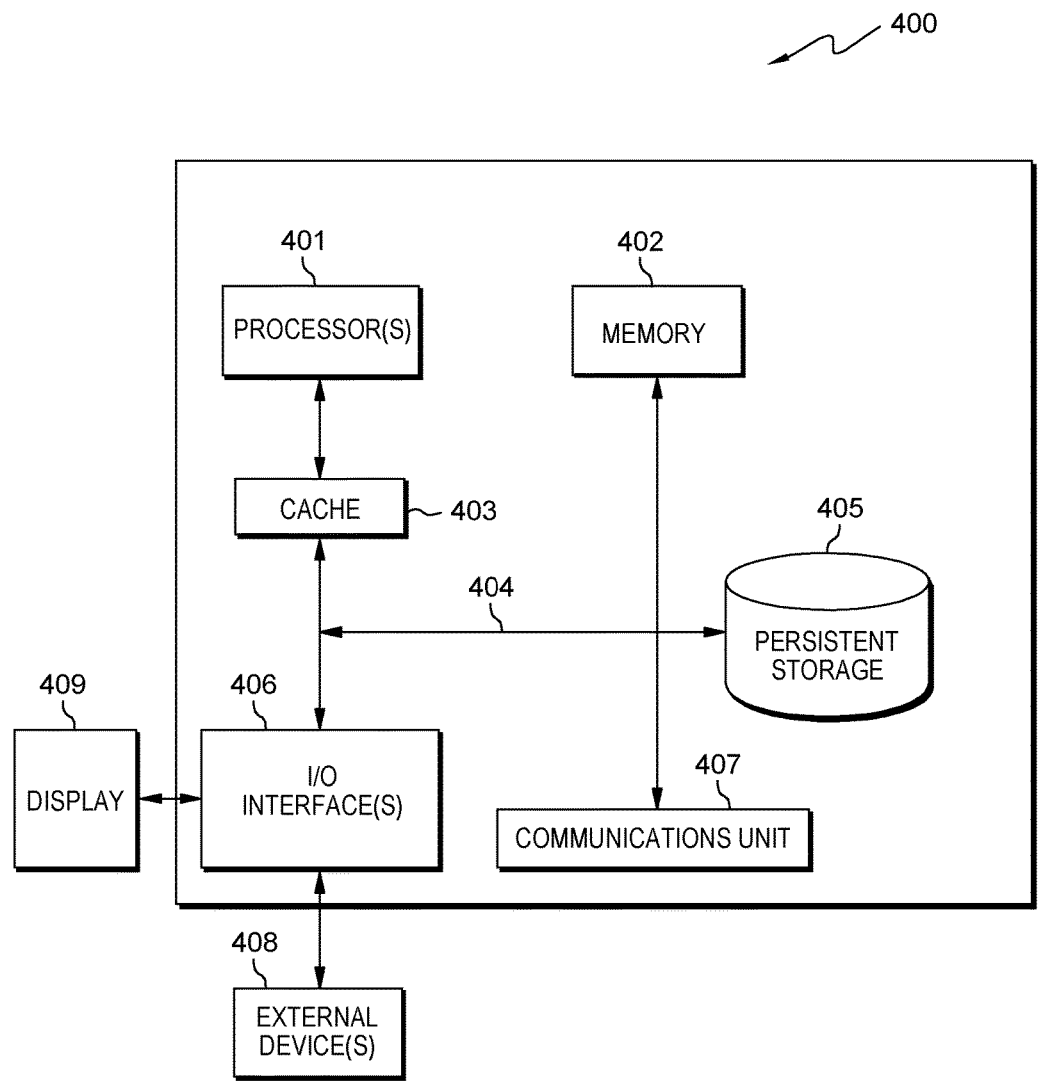
FIG. 4 depicts a block diagram of components of the computing environment of FIG. 1, in accordance with an embodiment of the present invention.

FIG. 4 depicts computer system 400, which is an example of a system that includes conversation analysis program 137. Computer system 400 includes processors 401, cache 403, memory 402, persistent storage 405, communications unit 407, input/output (I/O) interface(s) 406 and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention may be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface 406 may provide a connection to external devices 408 such as a keyboard, keypad, a touchscreen, and/or some other suitable input device. External devices 408 can also include portable computer readable storage media such as, for example, thumb drives, portable optical or magnetic disks, and memory cards. Software and data used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A computer program product comprising:
one or more non-transitory computer readable storage media and program instructions stored on the one or more non-transitory computer readable storage media, the program instructions comprising:
program instructions to receive an input of a conversation, in real time, between at least a first user and an automated response system, wherein the automated response system comprises an application that performs an automated task;
program instructions to analyze an utterance of the conversation to identify a dialog act attribute, an emotion attribute, and a tone attribute;
program instructions to annotate the utterance of the conversation with the dialog act attribute, the emotion attribute, and the tone attribute;
program instructions to validate the conversation based on the annotated attributes in comparison with a threshold, wherein program instructions to validate the conversation comprise:
program instructions to compare each annotated utterance in the conversation to a known database of best practice annotated conversations;
program instructions to determine a number of violations and a type of each violation using an algorithm selected from the group consisting of: a sequence alignment algorithm, an information retrieval method, a sequence-to-one model, and a weighted edit distance;
program instructions to score each annotated utterance based on the number of violations, based on the comparison of each annotated utterance to the known database of best practice annotated conversations;
program instructions to rank each utterance based on the scoring; and
program instructions to suggest a response for a second user to make to the first user based on each ranked utterance;
program instructions to store the annotated conversation and the validation of the conversation;
program instructions to determine that the validation of the conversation indicates that the conversation has not met the threshold;
program instructions to transfer the first user to a second user;
program instructions to retrieve a plurality of stored annotated conversations;
program instructions to analyze the plurality of stored annotated conversations, wherein the analysis determines a number of violations found in each annotated conversation;
program instructions to rank each annotated conversation in the plurality of stored annotated conversations based on the analysis; and program instructions to send at least one recommendation to a third user for improving at least one annotated conversation in the plurality of stored annotated conversations, wherein the at least one recommendation includes a change to a pre-defined dialog.

\* \* \* \* \*